US008406460B2

(12) United States Patent
Cok

(10) Patent No.: US 8,406,460 B2
(45) Date of Patent: *Mar. 26, 2013

(54) AUTOMATED TEMPLATE LAYOUT METHOD

(75) Inventor: Ronald S. Cok, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 380 days.

This patent is subject to a terminal disclaimer.

(21) Appl. No.: 12/767,837

(22) Filed: Apr. 27, 2010

(65) Prior Publication Data

US 2011/0261994 A1  Oct. 27, 2011

(51) Int. Cl.
 *G06K 9/62* (2006.01)
(52) U.S. Cl. ... 382/100; 382/209; 709/217; 348/231.99; 348/333.02
(58) Field of Classification Search .................. 382/100, 382/165, 224, 305, 306, 311, 209; 707/3; 386/95; 709/217; 348/333.02, 231.99
See application file for complete search history.

(56) References Cited

U.S. PATENT DOCUMENTS

| | | | |
|---|---|---|---|
| 403,304 A | 5/1889 | Sutcliffe et al. | |
| 5,957,502 A * | 9/1999 | Manico et al. | 283/67 |
| 5,986,671 A | 11/1999 | Fredlund | |
| 6,004,061 A * | 12/1999 | Manico et al. | 402/79 |
| 6,186,553 B1 | 2/2001 | Phillips et al. | |
| 6,389,181 B2 | 5/2002 | Shaffer et al. | |
| 6,711,293 B1 | 3/2004 | Lowe | |
| 6,771,801 B1 * | 8/2004 | Fisher et al. | 382/112 |
| 6,915,011 B2 | 7/2005 | Loui et al. | |
| 6,993,180 B2 | 1/2006 | Sun et al. | |
| 7,035,467 B2 | 4/2006 | Nicponski | |
| 7,090,253 B2 * | 8/2006 | Phillips et al. | 283/2 |
| 7,271,809 B2 | 9/2007 | Fedorovskaya et al. | |
| 7,298,895 B2 | 11/2007 | Loui et al. | |
| 7,366,994 B2 | 4/2008 | Loui | |
| 7,653,249 B2 | 1/2010 | Loui et al. | |
| 7,836,093 B2 * | 11/2010 | Gobeyn et al. | 707/802 |
| 2002/0055880 A1 * | 5/2002 | Unold et al. | 705/26 |
| 2004/0003411 A1 | 1/2004 | Nakai et al. | |
| 2004/0054659 A1 * | 3/2004 | McIntyre | 707/3 |
| 2004/0080670 A1 * | 4/2004 | Cheatle | 348/441 |
| 2006/0127155 A1 * | 6/2006 | Brickey et al. | 400/120.1 |
| 2006/0294096 A1 | 12/2006 | Kraus et al. | |
| 2007/0008321 A1 * | 1/2007 | Gallagher et al. | 345/473 |
| 2007/0116433 A1 * | 5/2007 | Manico et al. | 386/95 |
| 2007/0177805 A1 | 8/2007 | Gallagher | |
| 2007/0232399 A1 | 10/2007 | Kathman et al. | |
| 2008/0005771 A1 * | 1/2008 | Salvador | 725/105 |
| 2008/0028298 A1 * | 1/2008 | Kaneko | 715/243 |
| 2008/0030785 A1 | 2/2008 | Kuchenmeister | |
| 2008/0208791 A1 * | 8/2008 | Das et al. | 707/1 |
| 2008/0268876 A1 * | 10/2008 | Gelfand et al. | 455/457 |
| 2009/0174778 A1 * | 7/2009 | Allen et al. | 348/149 |
| 2009/0297032 A1 | 12/2009 | Loui et al. | |
| 2011/0029540 A1 * | 2/2011 | Ptucha et al. | 707/748 |
| 2011/0029552 A1 * | 2/2011 | Whitby et al. | 707/769 |
| 2011/0029553 A1 * | 2/2011 | Bogart et al. | 707/769 |
| 2011/0029562 A1 * | 2/2011 | Whitby et al. | 707/779 |
| 2011/0029914 A1 * | 2/2011 | Whitby et al. | 715/781 |
| 2011/0234613 A1 * | 9/2011 | Hanson et al. | 345/589 |
| 2012/0027303 A1 * | 2/2012 | Cok | 382/190 |

* cited by examiner

*Primary Examiner* — Chan S Park
*Assistant Examiner* — Iman K Kholdebarin

(57) ABSTRACT

A method for producing an image template having one or more openings for displaying images. The openings as well as the images are each associated with a season. The images are automatically analyzed to determine which season they most likely depict. Images are then selected to be placed in a template opening designated for a particular season. This method can be used to automate calendar production.

17 Claims, 7 Drawing Sheets

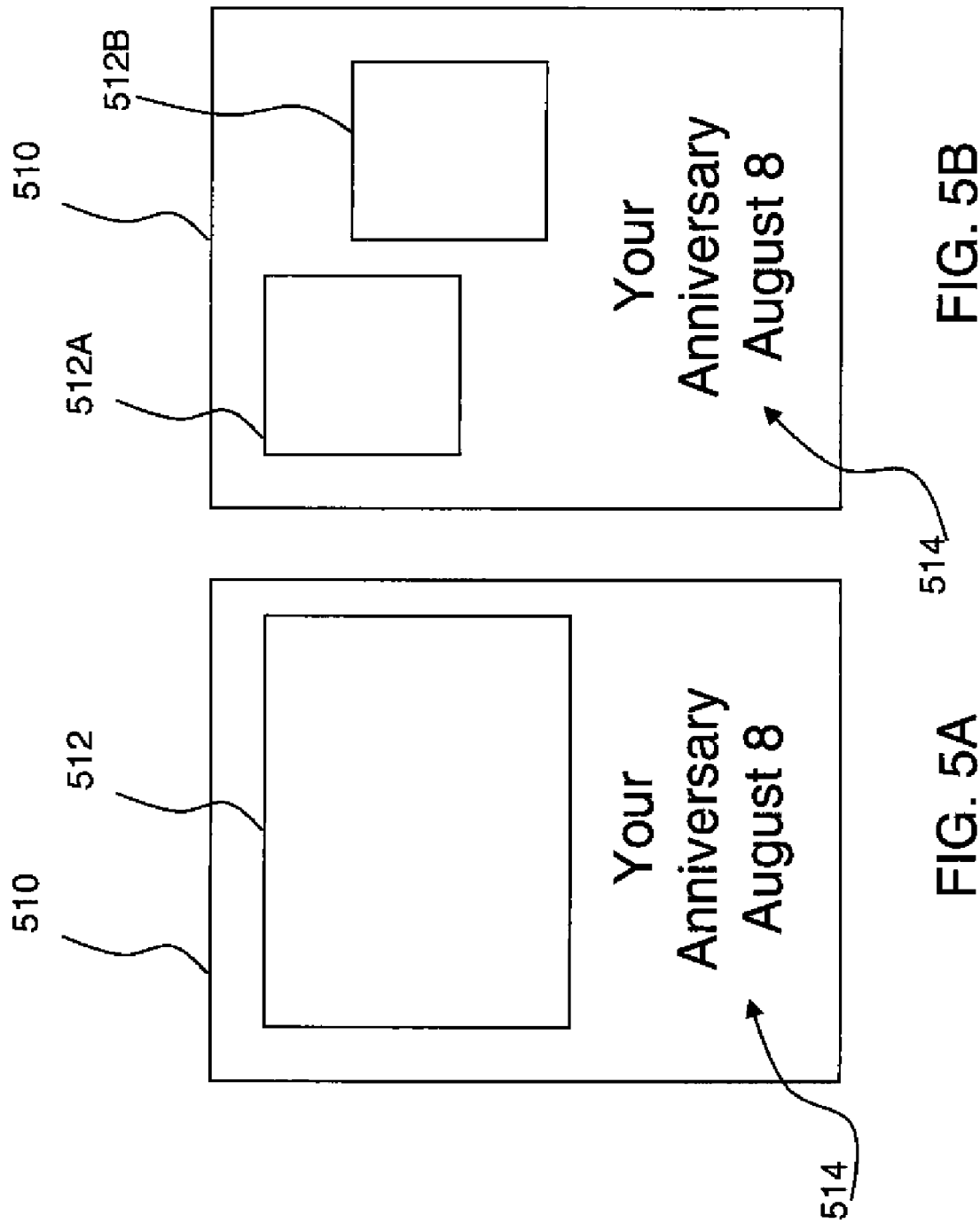

AUTOMATED TEMPLATE LAYOUT METHOD

CROSS REFERENCES TO RELATED APPLICATIONS

U.S. patent application Ser. No. 12/767,861, entitled "AUTOMATED TEMPLATE LAYOUT SYSTEM", filed concurrently herewith is assigned to the same assignee hereof, Eastman Kodak Company of Rochester, N.Y., and contains subject matter related, in certain respect, to the subject matter of the present application. The above-identified patent application is incorporated herein by reference.

FIELD OF THE INVENTION

The present invention relates to computer-implemented personalization of image products employing semantic analysis of digital images.

BACKGROUND OF THE INVENTION

Calendars are a widely used device for tracking the passage of time, for organizing activities, and providing reminders. Many calendars are printed on bi-fold paper with a grid of dates marked in weeks on one sheet and a decorative image printed on the other. The grid of dates is frequently large enough to accommodate written schedule reminders.

Most calendars include a year of dates and are organized around months and present a month of dates together with a decorative element, usually an image or graphic. Other calendars record a time span other than a year, for example a month or a season, for example the competitive season for a sporting team, or for a holiday season, such as the Christmas and New Year's holidays celebrated in many countries.

Calendars for a new year are often given as year-end gifts from one person to another and are personalized with images reminding the gift receiver of the gift giver. For example, children can make a calendar that includes pictures of their family and their family's activities throughout the year and give it to their grandparents.

In the past, creating such personalized calendars required significant work. Image selection, copying, and drawing calendars were expensive and labor-intensive. In recent years, calendar kits have become available that ease the task. In some cases, the kits provide preprinted calendars with suitable mounts for individual images. In other cases, computer software and layout tools are used together with digital images to create a personalized calendar. Nonetheless, the calendar creation task requires significant effort, particularly for the selection and layout of suitable images. This issue is becoming increasingly problematic, as the number of digital images that consumers make is becoming very large and reviewing them is increasingly tedious.

U.S. Pat. No. 5,986,671 describes a method of combining digital images within a template and illustrates the use of the method with a calendar. U.S. Pat. No. 6,186,553 and U.S. Pat. No. 7,090,253 describe the construction of a theme calendar using computer-aided layout tools and computer stored artwork. However, none of these prior-art methods address one of the central difficulties of personalized calendar creation, the selection of suitable images from a potentially large set of images.

In U.K. Patent Application GB2403304A, Rowe describes a method of labeling images with labels based on the image capture dates corresponding to national events (and seasons) for later use in text-based search and retrieval of images. However, not all images have reliable metadata for dates nor are all suitable for, or representative of, a desired season.

U.S. Patent Application 2007/0177805 describes a method of searching through a collection of images, includes providing a list of individuals of interest and features associated with such individuals; detecting people in the image collection; determining the likelihoods for each listed individual of appearing in each collection image in response to the detected people and the features associated with the listed individuals; and selecting in response to the determined likelihoods a number of collection images such that each individual from the list appears in the selected number of collection images. This enables a user to locate images of particular people but does not necessarily assist in finding suitable images for a particular season.

U.S. Pat. No. 7,271,809 describes a method for using viewing time to determine affective information in an imaging system that is employed to estimate user preferences for an image. This enables a user to locate preferred images but does not necessarily assist in finding suitable images for a particular season.

There is a need, therefore, for an improved method for personalizing an image product and making suitable image selections for the product.

SUMMARY OF THE INVENTION

In accordance with a preferred embodiment of the present invention, there is provided a computer implemented method for generating and storing a list of elements. The elements are objects found in, or characteristics of, a digital image. Each of the elements includes an associated season and a weight value indicating a strength of association between each element and its associated season. The method can be advantageously used by searching through digital images and, if an element is found in a digital image, a season identifier can be associated with the digital image. The season identifier can be stored with the digital image and later used to identify images associated with a particular season.

A digital image analysis step includes detecting a presence of one or more of the elements in each of the digital images, calculating a confidence value for each element detected in digital images, and calculating a season determination value for each of the digital images. The season determination value is based on the weight value for each of the elements found in the digital images and on a confidence value for each element detected. In this manner, an image is associated with a season and that determination is stored with the digital image for later use. Of course, each image will have many detected elements and each element will have a confidence value and a weight value associated with a particular season. These weights and values are used to calculate a final season determination value. This is the value that is stored with the digital image and is used to associate the image with a season.

In accordance with another preferred embodiment of the present invention, there is provided a computer implemented method for producing an image product by providing a template with openings for displaying digital images. Each opening is used for displaying an image depicting a particular season. By analyzing the pixels of the digital image the season depicted by the digital image is determined. The images displayed are first sorted into one or more seasonal groups. A digital image is selected from a seasonal group having the same season as is assigned to a corresponding template opening and a template is produced with the digital images.

In accordance with another preferred embodiment of the present invention, there is provided a computer implemented method for producing an image product. By analyzing the pixels of the digital images, a season depicted by the digital images is determined. A template having one or more openings corresponding to the determined season is selected. For each template opening, a selected digital image depicting a season intended for a particular template opening is displayed therein.

Preferred embodiments of the present invention have the advantage that the process of personalizing an image product is made simpler, faster, and provides a more satisfactory result. These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIGS. 5A and 5B are schematic illustrations of alternative image products made according to a method of a preferred embodiment of the present invention;

DETAILED DESCRIPTION OF THE INVENTION

Figure 1:
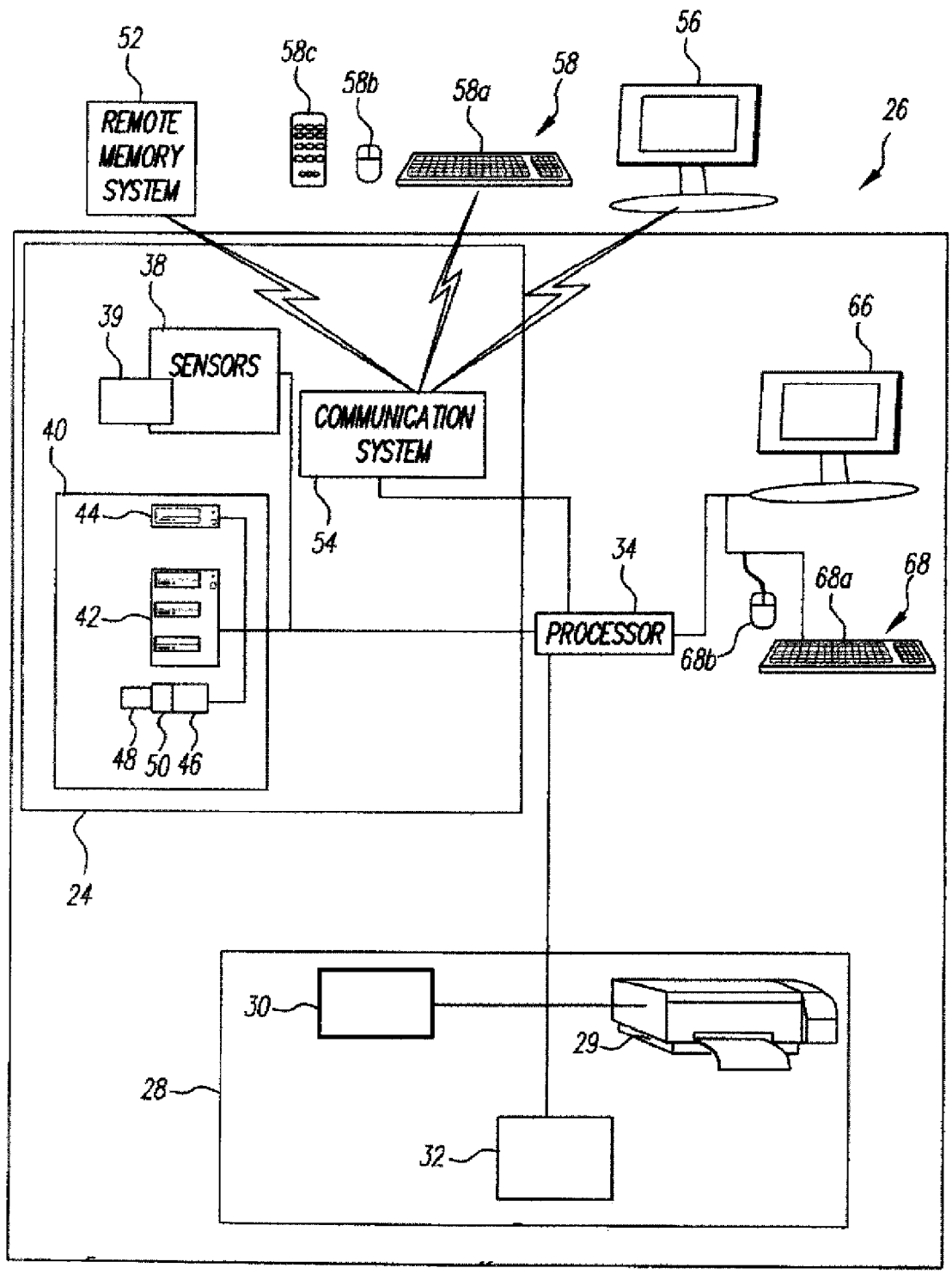
FIG. 1 illustrates a computer system for use in a preferred embodiment of the present invention.

FIG. 1 illustrates a first embodiment of an electronic system 26, a computer system, for implementing certain embodiments of the present invention for automatically generating image enhanced products. In the embodiment of FIG. 1, electronic computer system 26 comprises a source of content and program data files 24 such as software applications, calendar template files, calendar designs, association sets, image files, and image season information, which includes various memory and storage devices 40, a wired user input system 68 as well as a wireless input system 58, and an output system 28, all communicating directly or indirectly with processor 34. Although not shown processor 34 is meant to illustrate typical processor system and chip components such as instruction and execution registers, an ALU, various levels of cache memory, etc. The source of program and content data files 24, user input system 68, or output system 28, and processor 34 can be located within a housing (not shown). In other embodiments, circuits and systems of the source of content and program data files 24, user input system 68 or output system 28 can be located in whole or in part outside of a housing.

The source of content or program data files 24 can include any form of electronic, optical, or magnetic storage such as optical discs, storage discs, diskettes, flash drives, etc., or other circuit or system that can supply digital data to processor 34 from which processor 34 can load software, calendar template files, calendar designs, association sets, image files, and image season information, and derived and recorded metadata. In this regard, the content and program data files can comprise, for example and without limitation, software applications, a still image data base, image sequences, a video data base, graphics, and computer generated images, image information associated with still, video, or graphic images, and any other data necessary for practicing embodiments of the present invention as described herein. Source of content data files 24 can optionally include devices to capture images to create image data files by use of capture devices located at electronic computer system 20 and/or can obtain content data files that have been prepared by or using other devices, or image enhancement and editing software. In the embodiment of FIG. 1, sources of content or program data files 24 includes sensors 38, a memory and storage system 40 and a communication system 54.

Sensors 38 can include one or more cameras, video sensors, scanners, microphones, PDAs, palm tops, laptops that are adapted to capture images and can be coupled to processor 34 directly by cable or by removing portable memory 39 from these devices and/or computer systems and coupling the portable memory to slot 46. Sensors 38 can also include biometric or other sensors for measuring physical and mental reactions. Such sensors including, but not limited to, voice inflection, body movement, eye movement, pupil dilation, body temperature, and p4000 wave sensors.

Memory and storage 40 can include conventional digital memory devices including solid state, magnetic, optical or other data storage devices, as mentioned above. Memory 40 can be fixed within system 26 or it can be removable and portable. In the embodiment of FIG. 1, system 26 is shown having a hard disk drive 42, which can be an attachable external hard drive, which can include an operating system for electronic computer system 26, and other software programs and applications such as the program algorithm embodiments of the present invention, a template design data base, derived and recorded metadata, image files, image attributes, software applications, and a digital image data base. A disk drive 44 for a removable disk such as an optical, magnetic or other disk memory (not shown) can also include control programs and software programs useful for certain embodiments of the present invention, and a memory card slot 46 that holds a removable portable memory 48 such as a removable memory card or flash memory drive or other connectable memory and has a removable memory interface 50 for communicating with removable memory 48. Data including, but not limited to, control programs, template designs, derived and recorded metadata, digital image files, image attributes, software applications, digital images, and metadata can also be stored in a remote memory system 52 such as a personal computer, computer network, a network connected server, or other digital system.

In the embodiment shown in FIG. 1, system 26 has a communication system 54 that in this embodiment can be used to communicate with an optional remote input 58, remote memory system 52, an optional remote display 56, for example by transmitting image designs in the form of calendar template designs with or without merged images and receiving from remote memory system 52, a variety of control programs, template designs, derived and recorded metadata, image files, image attributes, and software applications. Although communication system 54 is shown as a wireless communication system, it can also include a modem for coupling to a network over a communication cable for providing to the computer system 26 access to the network and remote memory system 52. A remote input station including a remote display 56 and/or remote input controls 58 (also referred to herein as "remote input 58") can communicate with communication system 54 wirelessly as illustrated or, again, can communicate in a wired fashion. In a preferred embodiment, a local input station including either or both of a local display 66 and local user input controls 68 (also referred to herein as "local user input 68") is connected to processor 34 which is connected to communication system 54 using a wired or wireless connection.

Communication system 54 can comprise for example, one or more optical, radio frequency or other transducer circuits or other systems that convert data into a form that can be conveyed to a remote device such as remote memory system 52 or remote display 56 using an optical signal, radio frequency signal or other form of signal. Communication system 54 can also be used to receive a digital image and other data, as exemplified above, from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, and peer-to-peer; cellular or other form of mobile telecommunication network, a local communication network such as wired or wireless local area network or any other conventional wired or wireless data transfer system.

User input system 68 provides a way for a user of system 26 to provide instructions to processor 34, such instructions comprising automated software algorithms of particular embodiments of the present invention that automatically generate coordinated image templates according to selected template designs. This software also allows a user to make a designation of content data files, such as selecting calendar templates and designating digital image files, to be used in automatically generating an image enhanced output calendar product according to an embodiment of the present invention and to select an output form for the output product. User controls 68a, 68b or 58a, 58b in user input system 68, 58, respectively, can also be used for a variety of other purposes including, but not limited to, allowing a user to arrange, organize and edit content data files, such as coordinated image displays and calendar image templates, to be incorporated into the image output product, for example, by incorporating image editing software in computer system 26 which can be used to override design automated image output products generated by computer system 26, as described below in certain preferred method embodiments of the present invention, to provide information about the user, to provide annotation data such as text data, to identify characters in the content data files, and to perform such other interactions with system 26 as will be described later.

In this regard user input system 68 can comprise any form of device capable of receiving an input from a user and converting this input into a form that can be used by processor 34. For example, user input system 68 can comprise a touch screen input 66, a touch pad input, a multi-way switch, a stylus system, a trackball system, a joystick system, a voice recognition system, a gesture recognition system, a keyboard 68a, mouse 68b, a remote control or other such systems. In the embodiment shown in FIG. 1, electronic computer system 26 includes an optional remote input 58 including a remote keyboard 58a, a remote mouse 58b, and a remote control 58c. Remote input 58 can take a variety of forms, including, but not limited to, the remote keyboard 58a, remote mouse 58b or remote control handheld device 58c illustrated in FIG. 1. Similarly, local input 68 can take a variety of forms. In the embodiment of FIG. 1, local display 66 and local user input 68 are shown directly connected to processor 34.

Figure 2:
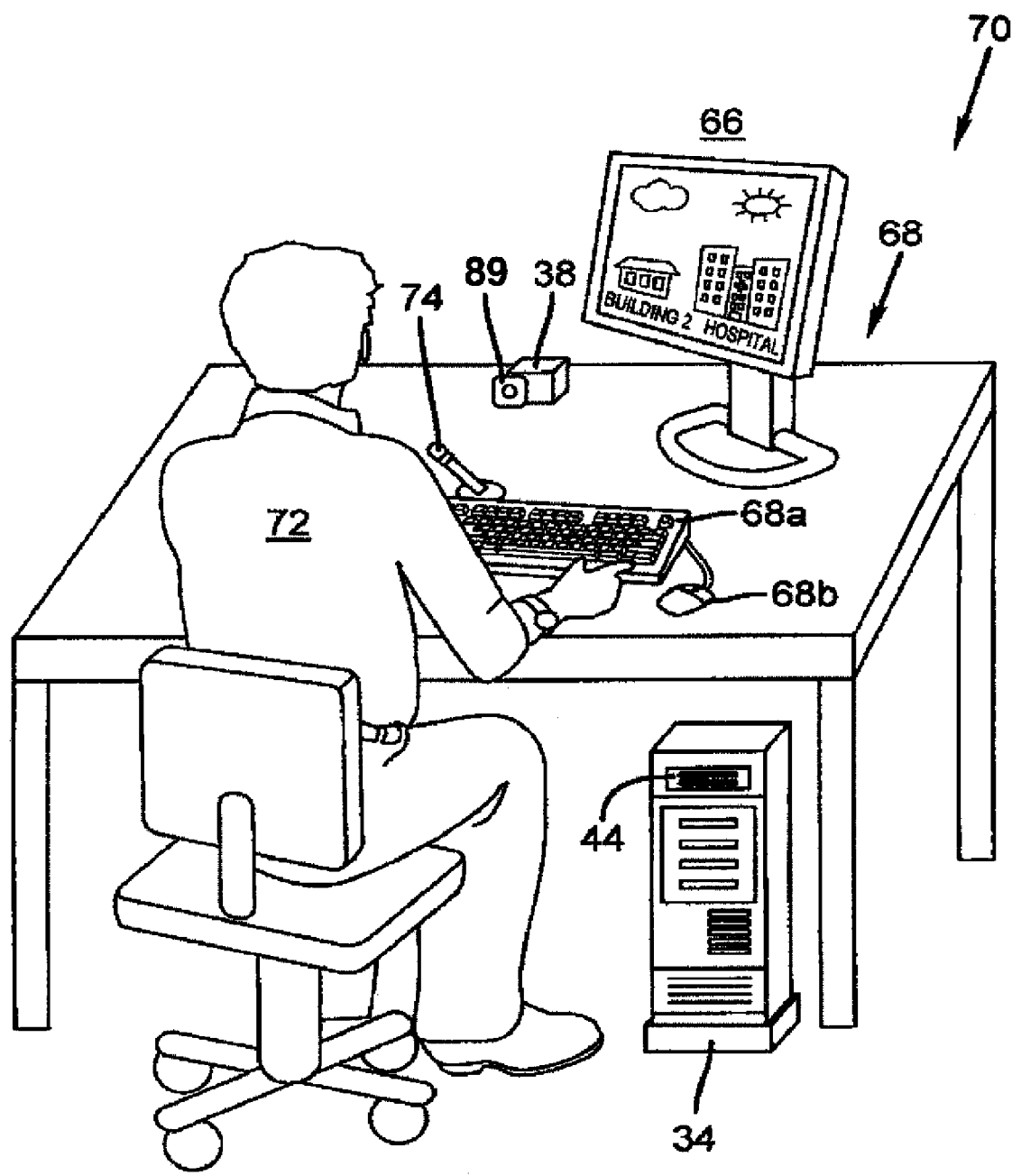
FIG. 2 illustrates a user implementing a computer system in a preferred embodiment of the present invention.

As is illustrated in FIG. 2, computer system 26 and local user input system 68 can take the form of an editing studio or kiosk 70 (hereafter also referred to as an "editing area 70"), although this illustration is not intended to limit the possibilities as described in FIG. 1 of editing studio implementations. In this illustration, a user 72 is seated before a console comprising local keyboard 68a and mouse 68b and a local display 66 which is capable, for example, of displaying multimedia content. As is also illustrated in FIG. 2, editing area 70 can also have sensors 38 including, but not limited to, camera or video sensors 38 with built in lenses 89, audio sensors 74 and other sensors such as, for example, multispectral sensors that can monitor user 72 during a user or production session.

Output system 28 (FIG. 1) is used for rendering images, text, completed or uncompleted digital image templates and other digital image output products, or other graphical representations in a manner that allows an image output product to be generated. In this regard, output system 28 can comprise any conventional structure or system that is known for printing, displaying, or recording images, including, but not limited to, printer 29. For example, in other embodiments, output system 28 can include a plurality of printers 29, 30, 32, and types of printers, including transfer machines capable of screen printing t-shirts and other articles. Processor 34 is capable of sending print commands and print date to a plurality of printers or to a network of printers. Each printer of the plurality of printers can be of the same or a different type of printer, and each printer may be able to produce prints of the same or a different format from others of the plurality of printers. Printer 29 can record images on a tangible surface, such as on, for example, various standard media or on clothing such as a T-shirt, using a variety of known technologies including, but not limited to, conventional four color offset separation printing or other contact printing, silk screening, dry electrophotography such as is used in the NexPress 2100 printer sold by Eastman Kodak Company, Rochester, N.Y., USA, thermal printing technology such as in thermal printer 30, drop on demand ink jet technology and continuous inkjet technology. For the purpose of the following discussions, printers 29, 30, 32 will be described as being of a type that generates color images. However, it will be appreciated that this is not necessary and that the claimed methods and apparatuses herein can be practiced with printers 29, 30, 32 that print monotone images such as black and white, grayscale or sepia toned images.

In certain embodiments, the source of content data files 24, user input system 68 and output system 28 can share components. Processor 34 operates system 26 based upon signals from user input system 58, 68, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit chip, or a series of discrete chip components.

Figure 3:
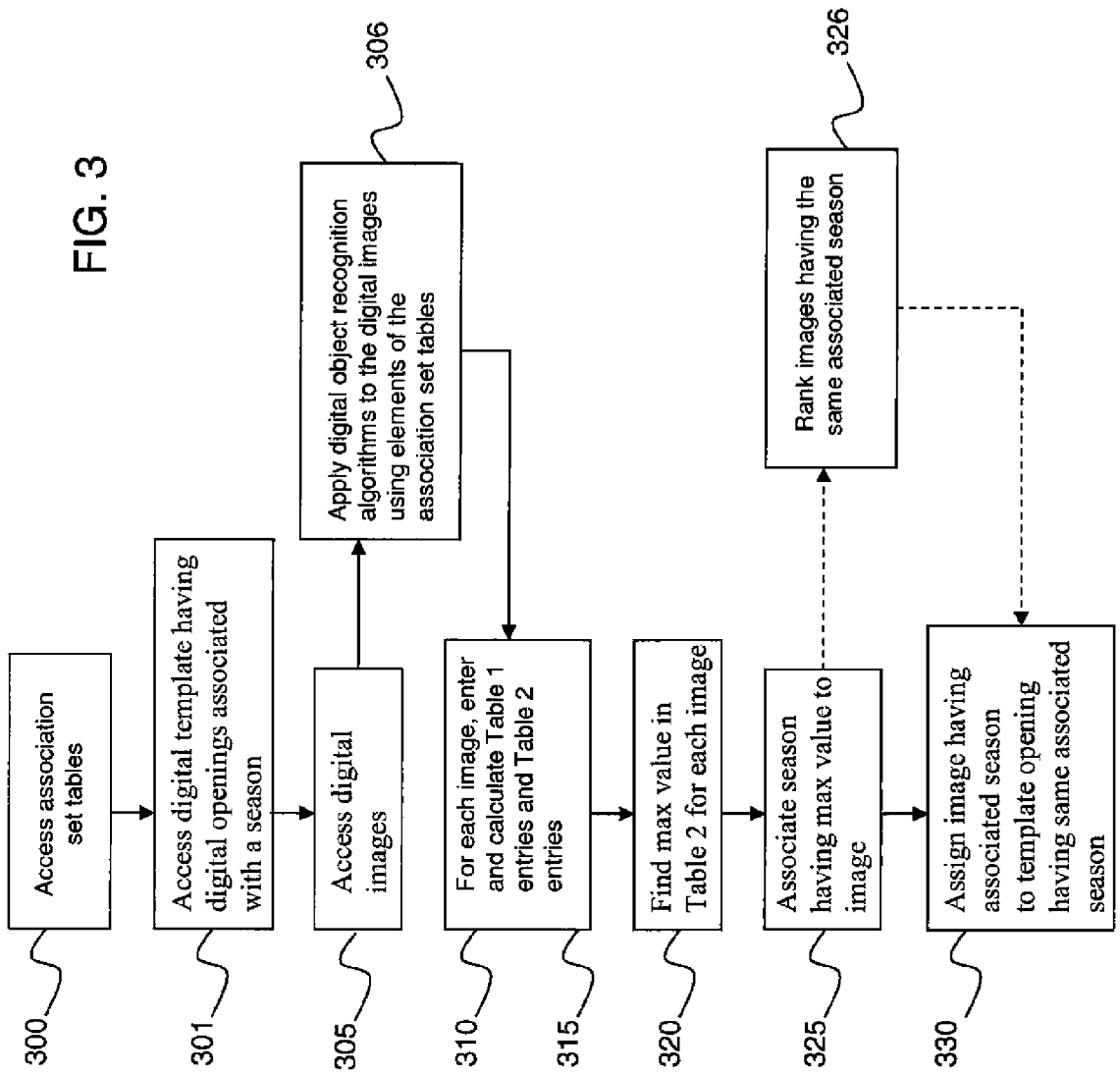
FIG. 3 is a flow chart of a method according to an embodiment of the present invention.

Referring to FIG. 3, a flow chart describing a computer implemented method of assigning a digital image to a template opening is illustrated. In step 300, an association set, such as described below with reference to Table 1 and Table 2, is accessed by the computer system. The association set can be previously stored in the computer system or provided by a user via portable memory or otherwise accessible over a local or wide area network or over the internet by computer system 26. A digital template with one or more openings each with an associated season is accessed and selected in step 301. Similar to the step of accessing an association set, the digital template can be selected from a group of previously stored digital templates in the computer system or provided by a user via portable memory or otherwise accessible over a local or wide area network or over the internet by computer system 26. Each opening in the digital template is associated with a season based on data stored with the template file which also contains a digital image of the template for displaying on system display 56, 66. An image set comprising digital images from which suitable images are to be found is selected in step 305. Similar to the step of accessing an association set and a digital template, the digital images are selected from a group of previously stored digital images in the computer system or provided by a user via portable memory or otherwise accessible over a local or wide area network or over the internet by computer system 26. In step 310, each image is analyzed to determine the best season match for that image. In order to calculate such a match, well known algorithms for identifying objects, colors, textures, or shapes appearing in each image are utilized in step 306. Although not described in detail herein, such algorithms are described in, for example, *Digital Image Processing: PIKS Scientific Inside* by William K. Pratt, 4th edition, copyright 2007 by John Wiley and Sons, ISBN: 978-0-471-76777-0, and U.S. Pat. No. 6,711,293, to Lowe, which defines an algorithm for object recognition and an aggregate correlation that is useable as a confidence value, which is incorporated herein by reference in its entirety. The result of the algorithms includes a confidence value that a detected object, color, texture, or shape in each digital image is accurately identified. Table 1, in which each Element in the association set is searched for in each digital image, provides a list of Elements to search for (first column) as well as table cells for entering the results of the search. Thus, a preferred embodiment of the present invention includes the step of reading the table entries under the Elements column and, for each Element, applies the well known object identification algorithms identified above to calculate for each Element a confidence value ($C_i$) that an object, color, texture, or shape corresponding to the current Element has been detected in the current digital image. The value is entered in the table for that particular Element.

The table separately charts a prevalence value ($P_i$ or $P_{ij}$) for each season corresponding to each Element which indicates a strength of association between the Element and the season. This prevalence value is separately determined and can be provided in the table and stored in the computer system. The prevalence values can be determined in a variety of ways. They can be calculated based on historical searches of large numbers of digital images, or they can be entered and stored by individuals providing a subjective value that indicates an association between such an Element in an image and its correspondence to a season. For example, a detected beach scene can have a high prevalence value for the season "Summer" or for the holiday season "4th of July" and a low prevalence value for the season "Winter" or for the holiday season "Christmas." Such prevalence values are compiled and stored with the table. Some Elements may have an association of zero with a particular season. Other Elements may have a varying value for every season column listed. An Elements having an equal prevalence value for each season listed in the columns would not serve to differentiate the current image for association with a season. Stored prevalence values can be reused as desired by a user. The user can also enter such prevalence values to be stored in the association set. In this case, a user who is familiar with his or her collection of digital images can enter realistic prevalence values for each season for Elements appearing in his or her image collection which will result in more accurate season identifications for his or her image collection.

Continuing with the algorithm for implementing step 310, the Table 1 cells can now be calculated and final values entered therein using Eqn. 1 as shown below. In a preferred embodiment of the present invention, the confidence value for each Element is multiplied by the prevalence value for each season to determine the Table 1 cell values Wseason. The preferred embodiment of the present invention is not limited only to this algorithm. Table 1 can be easily constructed as a multi-dimensional data structure to include more inputs for calculating cell values. Thus, the formula for determining Wseason can be implemented using Eqn. 3 shown below. As an example, a user's image collection that includes metadata that identifies user favorite images can be used as input to this equation and a resulting Wseason value will be increased for user favorite images. Other image values can also be included for such calculations. These inputs can be optionally used for Table 1 or for Table 2, as described below. After all Elements have been searched for in the digital image set, or in a user selected group of digital images, under consideration, the Total Wseason values are added for each column corresponding to a season as shown in the last row of Table 1.

The Total Wseason values entered into Table 1 are used in step 320 for populating Table 2. Each row in Table 2 corresponds to each image under consideration and contains the Total Wseason value obtained for a particular image from step 310. The last column of Table 2 is used to identify which season, of the seasons identified in the first row, is best associated with a particular image listed in the first column. The last row of Table 2 is used to identify which image, of the images identified in the first column, is best associated with a particular season listed in the first row. These are simply the highest value obtained from the respective row and column. Images tagged as user favorites can optionally be weighted more heavily and the inputs for those tags used when calculating the Max values in Table 2, rather than using them in calculating Table 1 cell values.

In step 325, the image with the largest value from Table 2 is selected as best representing the season associated with the template opening under consideration and is thereby associated with the template opening. This association can be implemented as a field entry in the template file containing the digital template image. Such association can be recorded in the digital template file as stored in the computer system or other storage location. An optional step, step 326, includes the step of ranking multiple images for each season according to its calculated values as provided in Table 2. Preference for inclusion in a template is then given to the higher valued images in step 325. The resulting weighting can be used, as described above, to order the digital images in a seasonal group (e.g. the columns in Table 2), so that the digital image with the highest weighting is preferred. In order to implement the present method for constructing a calendar, multiple templates are accessed, for example, one for each month, and the next template to be completed is accessed in step 301, and the process repeats until a most-representative image has been found in the image set for the season associated with each template opening and until the calendar is completed. Completed portions are stored in a calendar file until the entire calendar is completed.

Figure 4:
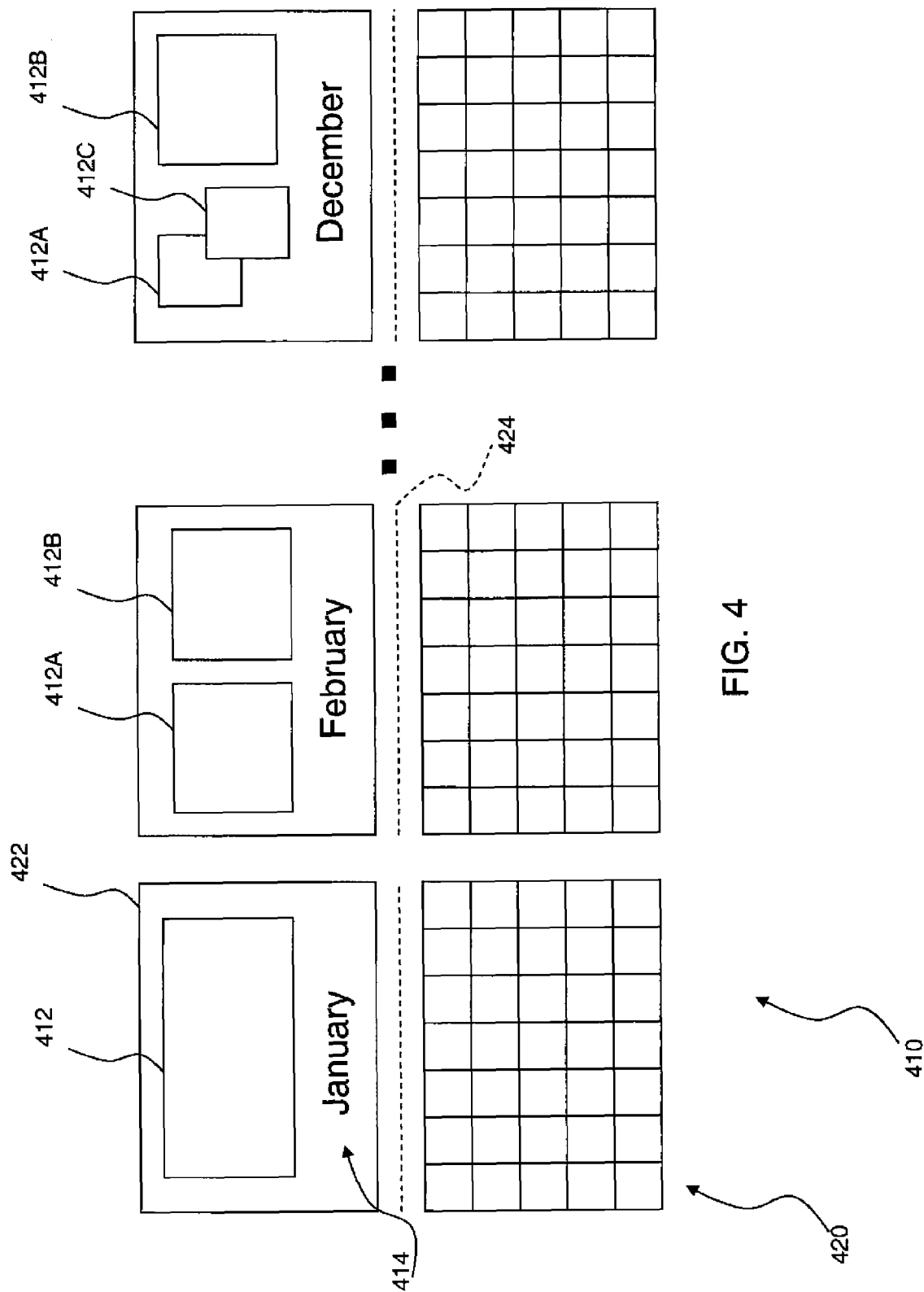
FIG. 4 is a schematic illustration of image products made according to a method of a preferred embodiment the present invention.
Figure 6:
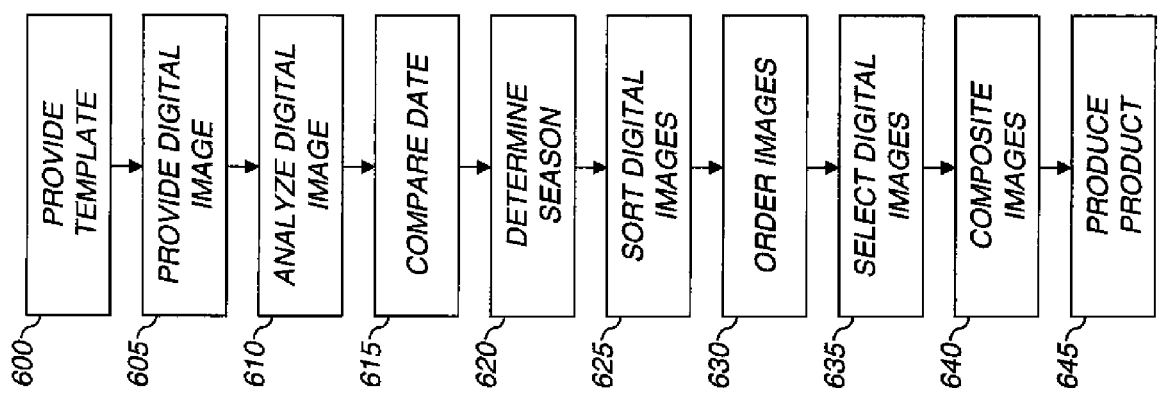
FIG. 6 is a flow graph of a method according to a preferred embodiment of the present invention.
Figure 8:
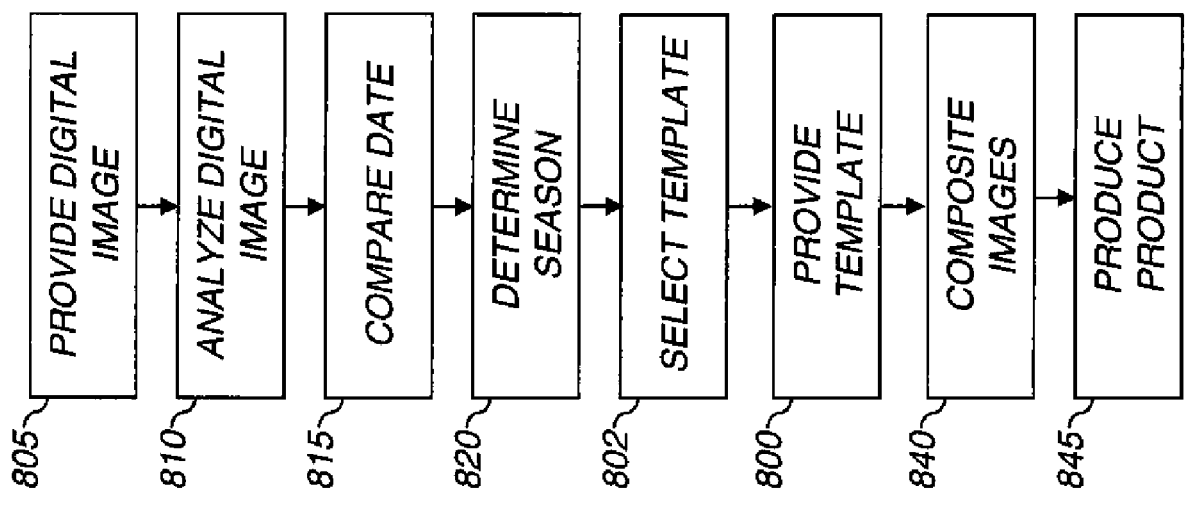
FIG. 8 is a flow graph of a method according to an alternative embodiment of the present invention.

Referring to FIGS. 4, 6, and 8, a method for producing a digital image product comprises the step 600 of a computer system providing a digital template 410 for display on a computer system 26 display 66 for digitally placing into one or more digital template openings 412 one or more digital images, each opening 412, 412A, 412B, 412C corresponding to a season. Data for associating each digital opening with a season, for example, Spring, Summer, Fall, Winter, is stored in a template file which also contains, or is associated with, the template image. One or more digital images having pixels are provided by a user of the computer system in step 605, 805. The computer system reads image files containing the digital images. These can be coupled to the computer system by the user via various storage devices capable of storing image files. At a high level, the present computer implemented method includes analyzing the pixels of the digital images in step 610, 810 to determine a season depicted by the digital images. In step 625, the digital images are sorted into one or more seasonal groups corresponding to the determined seasons. For each template opening, a digital image is selected from a seasonal group having the same season as the template opening in step 620, 820. In step 645, 845, the template with the digital images is produced as an image product. The details of an embodiment of this computer-implemented method will now be described.

The image product includes customized or un-customized text 414 and has one or several image openings, 412, 412A, 412B, 412C on one or more pages of the template. Thus, the template has one or a plurality of pages to which the method of the present invention can be applied. Image openings in the templates can overlap, form collages, or are in a portrait or landscape configuration. A grid of dates 420, for calendar image templates such as those of FIG. 4, is included on the bottom half of a bi-fold page folded across a center line 424. Such arrangements are known in the design art and such various designs and arrangements are contemplated for preferred embodiments of the present invention.

Therefore, the step 600 includes the computer-implemented step of providing a template having a plurality of openings corresponding to a plurality of seasons. Alternatively, the computer-implemented step 600 of providing a template includes the step of providing a template with a single opening having a single season associated therewith and the step of providing a template with a plurality of openings, each opening having a single season associated therewith.

Another preferred embodiment of the present invention includes the optional step 615, 815 of comparing the determined season stored in association with each of the digital images, via the method described below, to date or location data associated with the digital images that are also included as metadata stored in association with each digital image file. Digital cameras often include software that provides metadata associated with captured images that record details concerning the image capture, such as camera settings, the date of capture, and the location of capture, either through automated devices (e.g. an internal clock or global positioning system) or via user input. In another preferred embodiment of the present invention, metadata associated with each image is included in the step 620, 820 of determining the season of a digital image, wherein the metadata is read by the computer system and a corresponding season is associated with the digital image based on such metadata.

An associated date can be associated with a season. This association could be a simple month-to-season correspondence. Location information can also be used to improve accuracy when determining a season based on date information. Note however, that for some image products, the date may not be an adequate predictor of the suitability of a digital image for an image product. For example, it is desired to provide an image that is representative of a season. However, an image taken at a time during the season is not necessarily representative of the season. It is also possible that the date may be incorrect. Thus the associated metadata date is helpful in selecting a suitable image but is not necessarily indicative or completely definitive.

Similarly, an associated location can be associated with a season, especially in combination with a date. For example, it may be known that a location is associated with a season (e.g. a person is often in a particular place during a particular season). Hence, images associated with the place are associated with the season. As with the date, however, such association does not necessarily mean that an image is suitable to represent a season for a particular image product, particularly if it is desired that the image be representative of a season.

Once the season of an image is determined, it is sorted (step 625) into one or more seasonal groups corresponding to the determined seasons. In the simplest case, a single seasonal group has only one member, a single image. For example, it may be desired simply to determine whether a digital image corresponds to a desired season that is itself associated with a product template opening. In this case, the sorting is by default because there is only one candidate image and requires no action or list construction. Such a case is considered to satisfy a sorting step and is included in a preferred embodiment of the present invention. In more complex situations, for example in creating a one-year calendar, a plurality of images are examined and determined to belong to a plurality of seasonal groups, each group of which could include multiple images. In another preferred embodiment of the present invention, the images in a seasonal group are ranked (step 630) by image quality, user preferences, or the degree to which the image is representative of a season, or some desired combination of these characteristics. This is described in more detail below with reference to the valuation calculations. A variety of metrics can be employed to order, rank, or sort the images in order of image quality, for example, sharpness and exposure. Affective metrics (such as a user's favorite images, as determined by other well-known means or, known by a user's identifying and storing particular images as favorites) are employed in making the image selection (step 635) as well. Thus, desired digital images that have a greater quality than digital images having a lesser quality are preferentially selected.

The method of a preferred embodiment of the present invention includes the step of producing the template with the selected digital images disposed in the openings thereof. This is implemented by digitally compositing the digital images into the digital openings of the pages of the digital template (step 640, 840). Alternatively, printed images are physically mounted into or onto a product. The template with the digital images can be printed, stored, displayed, sold, or transported. As used herein, a template is also considered a product and includes the product type as well as image or design-related features of the product.

Images representing a variety of seasons can be employed with a preferred embodiment of the present invention. Typical seasons include weather-related seasons of the year, for example winter, spring, summer, autumn (fall), dry season, rainy (wet) season, monsoon season, and so forth. Holiday seasons can also be represented, for example Christmas, Hannukah, New Year's Valentine's Day, National Day (e.g. July 4 in the United States), and Thanksgiving. Seasons include personal holidays or celebrations, including birthdays and anniversaries.

The analysis step (610, 810) of a method of a preferred embodiment of the present invention is facilitated by providing an association set, such as depicted in Table 1, that includes Elements such as objects, colors, textures, or shapes that might be found in a digital image undergoing analysis for selective placement in a template. Each object, color, texture, or shape listed in the Element column of Table 1 has an associated prevalence value corresponding to each of a number of seasons, also listed individually in columns corresponding to each season. Thus, an object listed in the first column of elements has a plurality of prevalence values listed in the row to the right of the Element indicating its magnitude of correlation to each particular season. For example, if an association set includes "Christmas tree" in its column of Elements a corresponding prevalence value under a "Winter" season column will be higher than its prevalence value under a "Summer" season column. Similarly, if a plurality of Season columns includes holiday seasons, then an image having a detected Christmas tree will have a higher prevalence value in its Christmas season column than in its Easter season column. This association set is formed by ethnographic or cultural research, for example by displaying a large number of images to members of a cultural group. The members then relate objects found in each scene to each season and ranking the object importance to provide prevalence values. The aggregated responses from many respondents can then be used to populate the association set.

During an analysis step, the programmed computer system accesses a previously stored association set and searches each digital image for Elements identified therein. If an object, color, texture, or shape is found within a digital image that is in the association set, the digital image is scored with respect to each of the seasons that might correspond with the found Element. The resulting score is the prevalence value as between the found object (Element) and the Season (column) under analysis. Various Elements listed in the association set may be found in each of a plurality of images, resulting in Total Prevalence values that are the sum of prevalence values in each Season column. The Season column having the highest Total Prevalence value is the Season associated with a particular image. Such scored images are sorted and stored into seasonal groups by assigning the digital images to the seasonal group corresponding to its associated season.

The following list provides some association sets useful for implementing the analysis step in different countries or cultures. Note that different cultures have widely differing associations, so that an association set is culturally dependent. The color white can be associated with winter, Christmas, anniversaries, weddings, and death. The color green can be associated with Christmas, Spring, St. Patrick's Day, and Summer. The color red can be associated with Christmas, Valentine's Day, and National Day. The color orange can be associated with autumn, thanksgiving, and National Day. Combinations of colors are associated with a season, for example red, white, and blue are the national colors of several countries and are associated with those countries' National Day. Flesh tones can be associated with summer, and seasons can be associated with digital images containing people, for example anniversaries and birthdays in which images of people are prevalent. Objects and displays can be part of association sets: Fireworks can be associated with summer, National Day, and New Year's Day, while candles can be associated with birthdays, anniversaries, and personal celebrations. Snow can be associated with winter and Christmas in northern climates, while green grass can be associated with spring and summer. Water can be associated with summer and holidays while flowers can be associated with anniversaries and Spring. According to a preferred embodiment of the present invention, association sets are not limited to the foregoing examples.

As these examples make clear, associating a digital image with a season involves a number of calculations as well as evaluating the metadata discussed above. A plurality of objects, colors, textures, or shapes listed in the association set can be found in a single digital image. Furthermore, an object, color, texture, or shape can be associated with more than one season.

Nonetheless, prevalence value results define which season or seasons are most highly associated with a particular image. In the event that an image is equally associated with a plurality of different seasons in an association set, a random method can be used to categorize the image into one of the seasons. Another option is to weight particular Elements as more indicative of a season and select a highest prevalence value of one of the Elements as the associated season.

The confidence value is an accuracy indicator of how likely the found element really is the element recognized and the prevalence value indicates how strongly the element is associated with the season.

The size of the element and the location of the element within the image also affect the prevalence value so that, in a preferred embodiment of the present invention, the prevalence value is a function rather than a single number. If both the confidence and prevalence values are low, the weight given to the seasonal assignment is likewise low. If both the confidence and prevalence values are high, the weight given to the seasonal assignment is high. In a preferred embodiment of the present invention, the weight value is a product of the confidence value and the prevalence value, as described in more detail below.

For example, a seasonal assignment weight value for a digital image for a given season is expressed as:

$$W\text{season} = \Sigma C_i * P_i \qquad \text{Eqn. 1}$$

where $C_i$ is the confidence value that each found element i in the digital image is the matched element in the association set and $P_i$ is the prevalence value for each found element in the association set for each season. A C value can be determined using image processing calculations known in the image processing art. For example, a very specific object of a known size can be found by a two-dimensional convolution of an object prototype with a scene. The location of the largest value of the convolution represents the location of the object and the magnitude of the value represents the confidence that the object is found there. More robust methods include scale-invariant feature transforms that use a large collection of feature vectors. This algorithm is used in computer vision to detect and describe local features in images (see e.g. U.S. Pat. No. 6,711,293 entitled "Method and apparatus for identifying scale-invariant features in an image and use of same for locating an object in an image", identified above). An alternative method can employ Haar-like features. Thus, Elements that are not found in the digital image have a C value of zero. Elements that are found in the digital image with a high degree of certainty, or confidence, have a C value of nearly 1. If the found element is highly correlated with a season, the P value is high. If the found element is not correlated with a season, the P value is low. The calculation is repeated for each Element for each season under evaluation. Each digital image under evaluation is analyzed and sorted into the seasonal group corresponding to the highest Wseason value. The images within each seasonal group are then ranked within the seasonal group by their Wseason values. The digital image with the highest Wseason value within a seasonal group is the preferred digital image for that season, e.g.

$$\text{Pref}_{group} = \text{MAX}(W\text{season}) \qquad \text{Eqn. 2}$$

The preferred image within a group is thus the image with the highest Wseason ranking and is selected for a corresponding-season template opening. As mentioned previously, if two images have equal Wseason values, a random selection procedure or a weighted selection procedure (e.g. preferred Element value) can be implemented to select a digital image.

The ranking can also include additional parameters or factors such as date and location correlation, or user preference (favorites). For example, $$W\text{season} = \Sigma C_i * P_i * D_i * L_i * F_i \qquad \text{Eqn. 3}$$

where Di is a date matching metric, Li is a location matching metric, and Fi is a preference matching metric. The Di value can be obtained from image capture devices that include clocks such as some digital cameras or by user input. The Li value can be obtained from image capture devices that include global positioning systems such as some digital cameras or by user input. The Fi value can be obtained from user input or records of image use, the more frequently used images being presumed to be favored.

While the combinations shown in the equations above are multiplicative, other combination formulas are possible, for example linear or a combination of linear and multiplicative.

In a preferred embodiment of the present invention, the association set is organized as a table, and a table can be generated for each image for the step of image analysis:

TABLE 1

| Element | Season 1 | Season 2 | Season 3 | Season 4 |
|---|---|---|---|---|
| Element 1($C_1$) | $P_{11}$ $W_i = C_1 * P_{11}$ | $P_{12}$ $W_i = C_1 * P_{12}$ | $P_{13}$ $W_i = C_1 * P_{13}$ | $P_{14}$ $W_i = C_1 * P_{14}$ |
| Element 2($C_2$) | $P_{21}$ $W_i = C_2 * P_{21}$ | $P_{22}$ $W_i = C_2 * P_{22}$ | $P_{23}$ $W_i = C_2 * P_{23}$ | $P_{24}$ $W_i = C_2 * P_{24}$ |
| Element 3($C_3$) | $P_{31}$ $W_i = C_3 * P_{31}$ | $P_{32}$ $W_i = C_3 * P_{32}$ | $P_{33}$ $W_i = C_3 * P_{33}$ | $P_{34}$ $W_i = C_3 * P_{34}$ |
| Element 4($C_4$) | $P_{41}$ $W_i = C_4 * P_{41}$ | $P_{42}$ $W_i = C_4 * P_{42}$ | $P_{43}$ $W_i = C_4 * P_{43}$ | $P_{44}$ $W_i = C_4 * P_{44}$ |
| Total | Wseason = $\Sigma C_i * P_i$ | Wseason = $\Sigma C_i * P_i$ | Wseason = $\Sigma C_i * P_i$ | Wseason = $\Sigma C_i * P_i$ |

In Table 1, the prevalence value associated with each element and season is illustrated. The first subscript is the element value and the second subscript is the season. The P value is a measure of the strength of the association between the element and the season and is valued between zero and 1. The C value for each Element is the confidence value that the Element is accurately identified in the digital image.

Note that this method can be used generally to create a table relating images to seasons, as shown below for Table 2. The row Total from example Table 1 comprises the four column values under seasons 1 through 4 for each row Image 1 through Image n in Table 2. Finally, the last column in Table 2 identifies which of the seasons for each image, Image 1 through Image n, has obtained the highest seasonal determination value ($\text{MAX}(W_{ij})$) and is used as the season associated with that image.

TABLE 2

| Image | Season 1 | Season 2 | Season 3 | Season 4 | Best Season Match |
|---|---|---|---|---|---|
| Image 1 | $W_{11}$ | $W_{12}$ | $W_{13}$ | $W_{14}$ | $\text{MAX}(W_{1j})$ |
| Image 2 | $W_{21}$ | $W_{22}$ | $W_{23}$ | $W_{24}$ | $\text{MAX}(W_{2j})$ |
| Image 3 | $W_{31}$ | $W_{32}$ | $W_{33}$ | $W_{34}$ | $\text{MAX}(W_{3j})$ |
| Image 4 | $W_{41}$ | $W_{42}$ | $W_{43}$ | $W_{44}$ | $\text{MAX}(W_{4j})$ |
| Best Image Match | $\text{MAX}(W_{i1})$ | $\text{MAX}(W_{i2})$ | $\text{MAX}(W_{i3})$ | $\text{MAX}(W_{i4})$ | |

Figure 7:
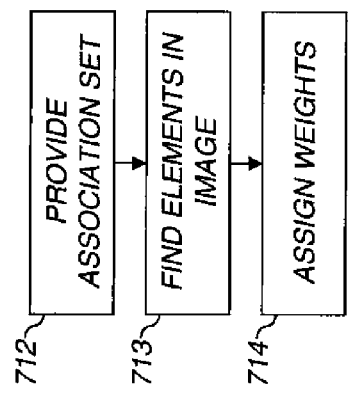
FIG. 7 is a flow graph of a portion of a method according to a preferred embodiment of the present invention.

In Table 2, the weighting for each image in an image set for each seasonal opening in a template is shown as calculated in the equations and Table 1 above. The largest value in a season column specifies the best image match for that season. The largest value in an image row specifies the best seasonal match for an image. If it is desired to match a template to a selected image, a template with a seasonal opening corresponding to the best seasonal match for the selected image can be chosen (largest value in the image row). If it is desired to match an image to a selected template, an image with the maximum value for that season can be chosen (largest value in the season column). Referring to FIG. 7, the association set is provided in step 712, elements in an image found in step 713, and weights assigned in step 714 to each found element. A combination of different weights can be used to determine the associated season.

The method of a preferred embodiment of the present invention is employed to create a calendar, as illustrated in FIG. 6. The step 600 of providing a template includes the step of providing a calendar and the calendar includes a template for each month of the calendar year. The months are each associated with a season and the template for each month includes a digital image selected from a seasonal group associated with the month. The calendar is a bi-fold calendar having an upper page and a lower page, the upper page including one or more digital images and the lower page including a grid of dates. The steps for forming such pages that include images and grids, which are then ordered and attached, fastened, or fixed together, are well known in the art and are not described further.

In an alternative illustration, a preferred embodiment of the present invention is employed to create the image products illustrated in FIGS. 5A and 5B. In FIG. 5A a single-sheet template 510 includes an opening 512 for a digital image. Customized text is employed and decorative elements (not shown) are also included. FIG. 5B illustrates a similar image product with two openings.

To make the image products illustrated in FIGS. 5A and 5B, a method of a preferred embodiment of the present invention searches through a set of digital images. Since only one season is needed for the image product (e.g. calculating a column of Table 2), the seasonal groups could be "anniversary" and "not anniversary". If suitable images are found that are assigned to the "anniversary" seasonal group, the image product is provided, for example by employing the suitable image with the highest ranking in the template opening.

In an alternative method, the template is selected after the digital images are analyzed (e.g. calculating a row of Table 2).

For example, a user might have a favorite image and desire an image product that appropriately employs and complements the favorite image. In this case, the digital image is analyzed and a season determined for the image. A corresponding image product that has a known theme associated with the season is provided and the selected digital image composited with the corresponding image product and produced.

Referring to FIG. 8, in this case the provision of the digital image (step 805) is the same step as selecting the digital image (if only one image is provided). If multiple images are provided, some selections take place. Once selected, the digital image is analyzed (step 810), a date is optionally compared (step 815) and a season determined (step 820). The provided digital image is composited 840 with the product associated with the selected template and the product is produced (step 845).

Combinations of the processes illustrated in the flow graphs of FIGS. 6 and 8 are possible, using the determined seasons of the digital images in combination with desired image products to make a final image product or products that include one or more digital images.

The invention has been described in detail with particular reference to certain preferred embodiments thereof, but it will be understood that variations and modifications are effected within the spirit and scope of the invention.

PARTS LIST

| | |
|---|---|
| 24 | system |
| 26 | system |
| 28 | system |
| 29 | printer |
| 30 | printer |
| 32 | I/O |
| 34 | processor |
| 35 | I/O |
| 38 | sensor |
| 39 | memory |
| 40 | storage |
| 42 | storage |
| 44 | storage |
| 46 | comm |
| 48 | memory |
| 50 | interface |
| 52 | memory |
| 54 | system |
| 56 | I/O |
| 58 | I/O |
| 58a | I/O |
| 58b | I/O |
| 58c | I/O |
| 66 | I/O |
| 68 | I/O |
| 68a | I/O |
| 68b | I/O |
| 70 | system |
| 72 | user |
| 300 | step |
| 301 | step |
| 305 | step |
| 306 | step |
| 310 | step |
| 315 | step |
| 320 | step |
| 325 | step |
| 326 | step |
| 330 | step |
| 410 | template |
| 412 | image opening |
| 412A | image opening |
| 412B | image opening |
| 412C | image opening |
| 414 | text |

-continued

PARTS LIST

| | |
|---|---|
| 420 | grid of dates |
| 422 | background |
| 424 | fold line |
| 510 | template |
| 512 | image opening |
| 512A | image opening |
| 512B | image opening |
| 514 | text |
| 600 | provide template step |
| 605 | provide digital image step |
| 610 | analyze digital image step |
| 615 | compare date step |
| 620 | determine season step |
| 625 | sort digital images step |
| 630 | order images step |
| 635 | select digital images step |
| 640 | composite images step |
| 645 | produce product step |
| 712 | step |
| 713 | step |
| 714 | step |
| 805 | provide digital image step |
| 810 | analyze digital image step |
| 815 | compare date step |
| 820 | determine season step |
| 802 | step |
| 800 | step |
| 840 | composite images step |
| 845 | produce product step |
| 800 | select template step |
| 805 | select image step |
| 810 | template loop step |
| 815 | image loop step |
| 820 | analyze image step |
| 825 | assign match step |
| 830 | increment image step |
| 835 | find maximum match value step |
| 840 | assign image to season step |
| 845 | increment opening step |

The invention claimed is:

1. A computer implemented method for producing an image product, comprising the steps of:

providing a plurality of digital images, each digital image having pixels;

providing a digital template having a plurality of digital template openings;

each digital template opening associated with one of a plurality of seasons for disposing one of the digital images therein, the digital template including at least two digital template openings each having an associated season, and wherein at least said one of the digital images is associated with one of the plurality of seasons;

automatically analyzing the pixels of the one or more digital images to determine which one of the plurality of seasons is depicted by each of the one or more digital images;

for each digital template opening, automatically disposing a digital image therein having associated therewith a same season as the season associated with that digital template opening;

producing the template having the digital images disposed in the one or more digital template openings therein storing each of the one or more digital images in a seasonal group corresponding to a determined season for each of the one or more digital images;

ranking the digital images in each seasonal group in order of a determined quality of each of the digital images in the seasonal group; and preferentially selecting digital images having a higher rank for display the images in the template openings.

2. The method of claim 1, further comprising the steps of storing a date and location corresponding to each of the one or more digital images.

3. The method of claim 1, further comprising the step of providing a template having a plurality of digital template openings all associated with a single season.

4. The method of claim 1, wherein the step of producing the templates includes a step selected from steps consisting of printing, storing, displaying, selling, and transporting the digital template having the one or more digital images disposed therein.

5. The method of claim 1, wherein the step of providing a template includes the step of providing a template that includes digital template openings associated with seasons selected from the group consisting of winter, spring, summer, autumn (fall), dry season, harmattan season, rainy (wet) season, monsoon season, and holiday seasons.

6. The method of claim 5, wherein the holiday seasons are selected from the group consisting of a birthday, an anniversary, Valentine's Day, National Day, Thanksgiving, Christmas, and New Year's Day.

7. The method of claim 1, wherein the step of automatically analyzing the pixels further includes the step of providing an association set including items selected from the group consisting of objects, colors, textures, and shapes, wherein each of said objects, colors, textures, or shapes has one of the plurality of seasons associated therewith.

8. The method of claim 7, wherein the step of automatically analyzing the pixels includes the step of finding in each of the one or more digital images an item from the association set and assigning each of the one or more digital images to a season corresponding to the item from the association set.

9. The method of claim 8, wherein a plurality of items in the association set are found in a single digital image.

10. The method of claim 8, wherein the step of automatically analyzing includes the step of providing a weighted value to each found item.

11. The method of claim 10, wherein the weighted value indicates a likelihood that each found item matches the item in the association set.

12. The method of claim 10, wherein the weighted value indicates a prevalence of each found item in its associated season.

13. The method of claim 10, wherein an item is associated with more than one season.

14. The method of claim 1, wherein the step of providing a digital template includes the step of providing a digital calendar template.

15. The method of claim 14, further comprising the steps of associating a month of the calendar with one of the plurality of seasons and wherein the template having the digital images disposed therein includes a digital image associated with a season associated with the month.

16. A computer implemented method for producing an image product, comprising the steps of:
providing a plurality of digital images each digital image having pixels;
analyzing the pixels of the one or more digital images for determining one of a plurality of seasons depicted by each of the one or more digital images;
providing a digital template having a plurality of digital template openings each associated with one of the plurality of seasons, each for disposing one of the one or more digital images therein, the digital template including at least two digital template openings each having an associated season and wherein at least one of the digital images is associated with one of the plurality of seasons;
for each digital template opening, selecting a digital image depicting a same season as that associated with said each digital template opening;
producing the image product comprising the digital template having the digital images disposed in the digital template openings therein
storing each of the one or more digital images in a seasonal group corresponding to a determined season for each of the one or more digital images;
ranking the digital images in each seasonal group in order of a determined quality of each of the digital images in the seasonal group; and
preferentially selecting digital images having a higher rank for display the images in the template openings.

17. The method of claim 16, further comprising the step of sorting the one or more digital images into one or more seasonal groups corresponding to the determined seasons of each of the digital images.

* * * * *

UNITED STATES PATENT AND TRADEMARK OFFICE
CERTIFICATE OF CORRECTION

PATENT NO. : 8,406,460 B2  
APPLICATION NO. : 12/767837  
DATED : March 26, 2013  
INVENTOR(S) : Cok Page 1 of 2

It is certified that error appears in the above-identified patent and that said Letters Patent is hereby corrected as shown below:

In the Specifications:

In Column 3, Line 42, delete "invention." and insert -- invention; --, therefor.

In Column 3, Line 44, delete "invention." and insert -- invention; --, therefor.

In Column 3, Line 56, delete "invention;" and insert -- invention; and --, therefor.

In Column 3, Line 58, delete "invention;" and insert -- invention. --, therefor.

In Column 8, Line 12, delete "An Elements" and insert -- An Element --, therefor.

In Column 12, Line 52, in Eqn. 1, delete "Wseason=ΣCi*Pi" and insert -- Wseason=Σ$C_i$*$P_i$ --, therefor.

In Column 12, Line 53, delete "Ci" and insert -- $C_i$ --, therefor.

In Column 12, Line 55, delete "Pi" and insert -- $P_i$ --, therefor.

In Column 13, Line 29, in Eqn. 3, delete "Wseason=ECi*Pi*Di*Li*Fi" and insert -- Wseason=Σ$C_i$*$P_i$*$D_i$*$L_i$*$F_i$ --, therefor.

In Column 13, Line 30, delete "Di" and insert -- $D_i$ --, therefor.

In Column 13, Line 30, delete "Li" and insert -- $L_i$ --, therefor.

In Column 13, Line 31, delete "Fi" and insert -- $F_i$ --, therefor.

In Column 13, Line 31, delete "Di" and insert -- $D_i$ --, therefor.

Signed and Sealed this  
Twentieth Day of August, 2013

Teresa Stanek Rea  
*Acting Director of the United States Patent and Trademark Office*

In Column 13, Line 33, delete "Li" and insert -- $L_i$ --, therefor.

In Column 13, Line 36, delete "Fi" and insert -- $F_i$ --, therefor.